E. NEWMAN & L. A. SEPPI.
VALVE GRINDING MACHINE.
APPLICATION FILED MAY 16, 1914.

1,131,611.

Patented Mar. 9, 1915.

Witnesses:
James M. Ablett
Marguerite Bates

By

Inventors,
Eugene Newman.
Louis A. Seppi.
Howard & Strauss
attys.

UNITED STATES PATENT OFFICE.

EUGENE NEWMAN AND LOUIS A. SEPPI, OF BREA, CALIFORNIA.

VALVE-GRINDING MACHINE.

1,131,611.

Specification of Letters Patent. Patented Mar. 9, 1915.

Application filed May 16, 1914. Serial No. 839,042.

*To all whom it may concern:*

Be it known that we, EUGENE NEWMAN and LOUIS A. SEPPI, both citizens of the United States, residing at Brea, in the county of Orange, State of California, have invented new and useful Improvements in Valve-Grinding Machines, of which the following is a specification.

This invention relates to a valve grinding machine.

It is the object of this invention to provide a machine for simultaneously grinding balls and the seats therefor in the manufacture of valves, such as are used in oil well pumps and the like.

In the manufacture of seats for ball valves they are ordinarily ground to fit the spherical face of the ball, but by reason of slight variations in the diameters of the balls a perfect seat therefor is difficult to manufacture.

It is the purpose of this invention to provide a machine by which the ball and the seat therefor may be ground by rotating the ball and the seat against each other so that an accurate fit will be obtained.

Figure 1:
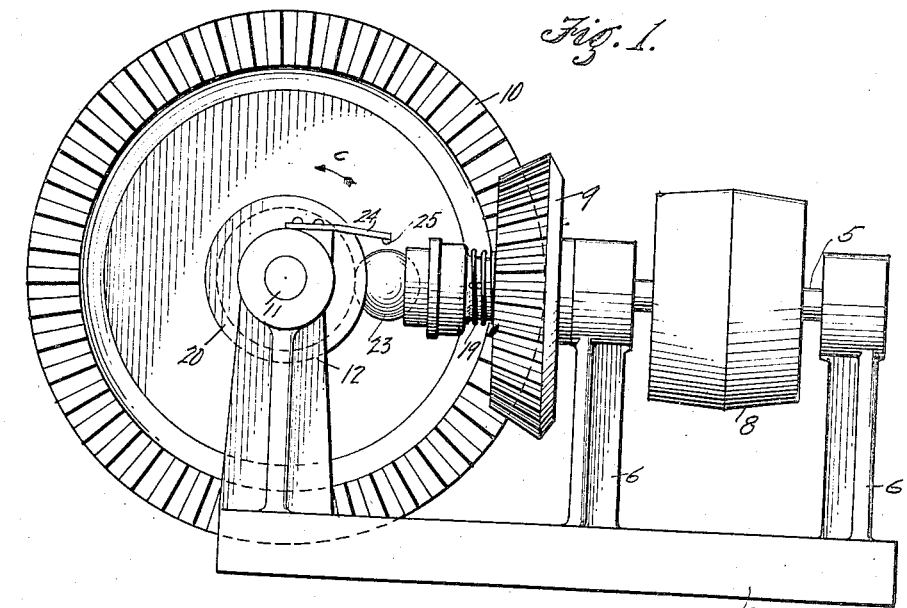
Figure 2:
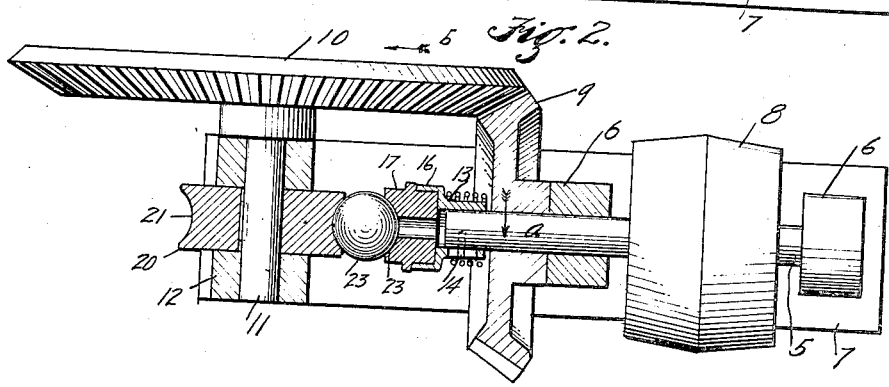
Figure 3:
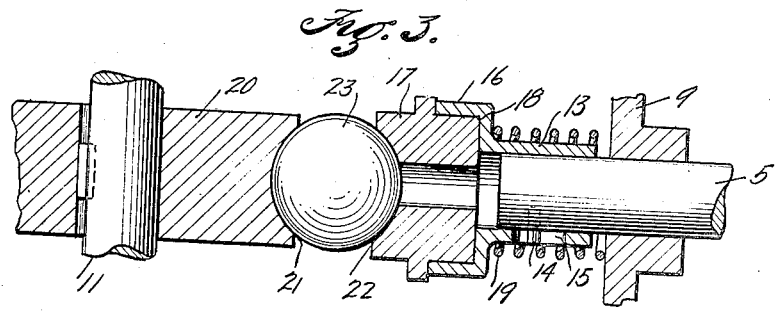

The invention is illustrated in the accompanying drawing, in which:

Figure 1 is a side view. Fig. 2 is a horizontal section on the line 2—2 of Fig. 1, partly in elevation. Fig. 3 is an enlarged sectional detail illustrating the manner of grinding the valve in its seat.

More specifically, 5 indicates a drive shaft supported in suitable bearings 6 carried by a bed plate 7 and which shaft is adapted to be rotated from any suitable source of power through a belt pulley 8 mounted thereon. Rigidly mounted in the shaft 5 is a beveled pinion 9 which meshes with a beveled gear 10 preferably of a diameter greater than that of the pinion 9, and which beveled gear is rigidly mounted on a shaft 11 revolubly mounted in the bearing 12 carried by the bed plate 7; the shaft 11 extending at right angles to the drive shaft 5 with its axes on a corresponding plane with the axes of the shaft 5. The shaft 5 extends beyond the outer face of the pinion 9 and has a sleeve 13 reciprocally mounted thereon; the sleeve 13 being held in place by means of a pin 14 secured to the shaft 5 and extending through a longitudinal slot 15 on the sleeve 13. This pin and slot connection permits of a longitudinal movement of the sleeve 13 on the shaft 5 and forms a connection by which the sleeve will be rotated with the shaft 5. The outer end of the sleeve 13 is enlarged and forms a chuck 16 to receive the valve seat 17 to be ground. A shoulder 18 is formed on the sleeve 13, and wound on the sleeve 13 bearing between the shoulder 18 and the outer face of the pinion 9 is a spiral spring 19 which exerts an outward pressure on the sleeve 13 and tends to normally maintain it in its outermost position. Rigidly mounted on the shaft 11 is a wheel 20 having its periphery formed with a channel 21 which channel is preferably formed on an arc of a circle with its center disposed in alinement with the center of the drive shaft 5.

In the operation of the invention, the valve seat 17 having a concave depression 22 on its outer face is positioned in the chuck 16 and a ball 23, which is designed to be seated in the concave depression 22, is placed therein with the side thereof diametrically opposite the concave valve seat 22 in contact with the channel 21 on the wheel 20; the ball 23 being held in frictional engagement with the wheel 20 by the action of the spring 19 which is depressed under tension by retracting the sleeve 13. The shaft 5 is then rotated in the direction indicated by the arrow —a— in Fig. 2, thus causing the chuck 16 and the valve seat 17 therein to rotate in the same direction. The pinion 9 in revolving operates to rotate the gear wheel 10 in the direction indicated by the arrow —b— in Fig. 2, which operates through the shaft 11 to revolve the wheel 20 in the direction of the arrow —c— in Fig. 1. The wheel 20 in rotating acts to revolve the ball 23 on a vertical plane, which, however, is subjected to the action of the rotary movement of the valve seat 17 which is in a direction at right angles to the direction of rotation imparted by the wheel 20. This causes the ball 23 to rotate universally between the wheel 20 and the valve seat 17. To effect the grinding action of the ball and the valve seat, a suitable abrasive material, such as carborundum, emery, or the like, in a finely pulverized state is delivered to the ball 23 when the latter is in rotation, this material being carried between the ball and the valve seat in such manner as to cause a grinding action both on the surface of the ball and on the valve seat as these members are rapidly rotated in relation to each other. The wheel 20 being rotated in an upward direction on the seat where it engages the ball 23 prevents the latter from becoming displaced, but as a means of insuring the ball remaining in position in the valve seat during the grinding operation, an arm 24 is mounted on the bearing 12 and is formed with an inturned portion 25, which projects over the top of the ball 23 in close proximity thereto and acts as a guard to prevent displacement of the ball. By the use of this device the ball and the valve seat may be accurately ground to fit each other.

What we claim is:

1. A machine for grinding ball valves, comprising a spring pressed rotary member for revolving the valve seat, and means for rotating the ball valve in the valve seat independent of the rotation of the valve seat revolving member.

2. In a valve grinding machine, a spring pressed rotary chuck for holding and revolving the valve seat, and a revoluble wheel having a grooved periphery arranged to engage a ball valve disposed in the valve seat, whereby the ball will be rotated in the valve seat simultaneous with the rotation of the latter by the chuck.

3. In a valve grinding machine, a revolving shaft, a spring pressed chuck on said shaft adapted to receive a valve seat, a pinion on said shaft, a gear wheel meshing with said pinion, a shaft on which said gear wheel is mounted extending at right angles to the drive shaft and on a plane therewith, a wheel formed with a grooved periphery on said shaft arranged in alinement with the drive shaft and adapted to engage the periphery of a valve interposed between the wheel and the valve seat carried by the chuck.

In witness that we claim the foregoing we have hereunto subscribed out names this 4th day of May, 1914.

E. NEWMAN.
L. A. SEPPI.

Witnesses:
 MARGUERITE BATES,
 MARIE BATTEY.